US009268483B2

(12) United States Patent
Dennis et al.

(10) Patent No.: US 9,268,483 B2
(45) Date of Patent: Feb. 23, 2016

(54) MULTI-TOUCH INPUT PLATFORM

(75) Inventors: Stephen V. Dennis, Bothell, WA (US); Xiao Tu, Sammamish, WA (US); Bryan D. Scott, Mill Creek, WA (US); Reed L. Townsend, Kirkland, WA (US); Todd A. Torset, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 575 days.

(21) Appl. No.: 12/122,045

(22) Filed: May 16, 2008

(65) Prior Publication Data

US 2009/0284479 A1 Nov. 19, 2009

(51) Int. Cl.
G06F 3/048 (2013.01)
G06F 3/0488 (2013.01)
G06F 3/0482 (2013.01)

(52) U.S. Cl.
CPC .......... *G06F 3/04883* (2013.01); *G06F 3/0482* (2013.01); *G06F 2203/04104* (2013.01); *G06F 2203/04808* (2013.01)

(58) Field of Classification Search
CPC .............. G06F 3/0488; G06F 3/04883; G06F 3/04845; G06F 17/245; G06F 17/246; G06F 3/048; G06F 2203/04808; G06F 3/0482; G06F 2203/04104
USPC ................... 345/173, 650; 715/863, 751, 754
See application file for complete search history.

(56) References Cited

U.S. PATENT DOCUMENTS

| 6,546,188 | B1* | 4/2003 | Ishii et al. ...................... 386/280 |
| 6,938,222 | B2* | 8/2005 | Hullender et al. ............ 715/863 |
| 7,030,861 | B1  | 4/2006 | Westerman et al. |
| 2002/0080126 | A1* | 6/2002 | Keely et al. .................... 345/179 |
| 2003/0156145 | A1* | 8/2003 | Hullender et al. ............ 345/863 |
| 2005/0052427 | A1* | 3/2005 | Wu et al. ......................... 345/173 |
| 2006/0026535 | A1* | 2/2006 | Hotelling et al. ............. 715/863 |
| 2006/0125803 | A1* | 6/2006 | Westerman et al. .......... 345/173 |
| 2006/0139338 | A1* | 6/2006 | Robrecht et al. .............. 345/175 |
| 2006/0197750 | A1* | 9/2006 | Kerr et al. ...................... 345/173 |
| 2006/0238518 | A1* | 10/2006 | Westerman et al. .......... 345/173 |
| 2006/0250380 | A1* | 11/2006 | Oliver ........................... 345/179 |
| 2007/0097151 | A1  | 5/2007 | Rosenberg |
| 2007/0146325 | A1* | 6/2007 | Poston et al. ................. 345/163 |
| 2007/0152961 | A1* | 7/2007 | Dunton et al. ................ 345/156 |
| 2007/0152984 | A1* | 7/2007 | Ording et al. ................. 345/173 |

(Continued)

OTHER PUBLICATIONS

Han, "Multi-Touch Interaction Research", Jeff Han, 2006, pp. 4.

(Continued)

*Primary Examiner* — Michael J Eurice
(74) *Attorney, Agent, or Firm* — Timothy Churna; Kate Drakos; Micky Minhas (57) ABSTRACT

This document describes tools having or interacting with a touch-sensitive device with one or more contact detectors that detect a tactile input from a user making contact with the contact detectors and an input/output module that persistently identifies contact data representing the detected tactile input. This identification is unique, thereby differentiating one or more tactile inputs from other current tactile inputs represented in the contact data. Using this unique identification, the input/output module can initiate an application to provide a function, such as data entry or a mapped function, associated with the detected tactile input. These data or mapped functions may, in many instances, provide a greater depth or breadth of functions by which users may interact with applications and computer systems.

20 Claims, 5 Drawing Sheets

(56) References Cited

U.S. PATENT DOCUMENTS

| | | | |
|---|---|---|---|
| 2007/0177804 A1* | 8/2007 | Elias et al. | 382/188 |
| 2007/0226636 A1* | 9/2007 | Carpenter et al. | 715/751 |
| 2007/0247435 A1* | 10/2007 | Benko et al. | 345/173 |
| 2007/0257891 A1* | 11/2007 | Esenther et al. | 345/173 |
| 2007/0262964 A1* | 11/2007 | Zotov et al. | 345/173 |
| 2008/0165141 A1* | 7/2008 | Christie | 345/173 |
| 2009/0147003 A1* | 6/2009 | Do et al. | 345/427 |

OTHER PUBLICATIONS

Grabham, "Dell Demos Multi-Touch Tablet PC", Nov. 17, 2007, Tech.co.uk, p. 1.

"Microsoft Announced "Surface": A Multi-Touch/Gesture Recognition Technology", 2006-2007, YulMedia Blog Network, pp. 5.

"SIMA Systems", Jul. 2007, SiMa Systems, Inc., pp. 1-4.

* cited by examiner

MULTI-TOUCH INPUT PLATFORM

BACKGROUND

Touch-sensitive devices permit users to interact with applications running on a computing system. While users appreciate the ability to intuitively interact with the computing system through these touch-sensitive devices, in many instances, the applications offer more functions or more complex functions than touch-sensitive devices are configured to detect. As a result, a user is often forced to interact with graphical objects or drop-down menus that detract from the touch-sensitive device's intuitive nature.

SUMMARY

This document describes tools having or interacting with a touch-sensitive device with one or more contact detectors that detect a tactile input from a user making contact with the contact detectors and an input/output module that persistently identifies contact data representing the detected tactile input. This identification is unique, thereby differentiating one or more tactile inputs from other current tactile inputs represented in the contact data. Using this unique identification, the input/output module can initiate an application to provide a function, such as data entry or a mapped function, associated with the detected tactile input. These data or mapped functions may, in many instances, provide a greater depth or breadth of functions by which users may interact with applications and computer systems.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to systems, modules, APIs, methods, computer-readable instructions (e.g., one or more computer-readable storage media having executable instructions), and/or techniques as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The use of similar reference numbers in different instances in the description and the figures may indicate similar or identical items.

DETAILED DESCRIPTION

Overview

Some touch-sensitive devices, such as some touch pads and touch screens, are unable to detect and/or track multiple tactile inputs. A touch-sensitive device that cannot detect multiple tactile inputs is of limited use because many applications provide robust and numerous functions. Thus, a computing system or other electronic device with a single-input touch-sensitive device may lose out in the marketplace over other computing systems that include a multi-input touch-sensitive device. Computing systems and electronic devices that are enabled to detect multiple tactile inputs, however, are often complex in order to handle these multiple inputs.

Consider, for example, a user named Emily who is using her smart phone with a multi-input touch-sensitive device to surf the Internet to find a nearby clothing store. In this situation, Emily may want to access functions, such as pan, zoom, or scroll a web page. These functions do not correspond well to a single tactile input. Thus, if Emily would like to "zoom-in" on a map to find a nearby clothing store, she may be obligated to interact with a displayed graphical object (e.g., a tool bar) if her phone is not multi-touch enabled. If Emily's smart phone is capable of identifying multiple tactile inputs, it and its accompanying hardware, software, firmware, or application program interface (API) may be significantly more complex than a touch-sensitive device that detects but one tactile input. A multi-touch-enabled device may be complex because the included hardware and software should account for concurrent tactile-input scenarios as well as single-touch scenarios. A single-touch scenario occurs when, for instance, Emily draws the letter "L" on her touch device to enter a letter "L" into an instant messaging (IM) application on her smart phone.

In the following discussion, an example environment is first described in which the tools enable a touch-sensitive device to detect multiple tactile inputs intended for raw data entry. Sample multi-touch and single-touch scenarios are then described. Another example environment follows in which the tools detect multiple tactile inputs that are associated with a mapped function. Example techniques are also described. Although these tools are described as employed within particular kinds of computing environments in the following discussion, it should be readily apparent that these tools may be incorporated within a variety of environments without departing from the spirit and scope thereof.

Example Environment

Figure 1:
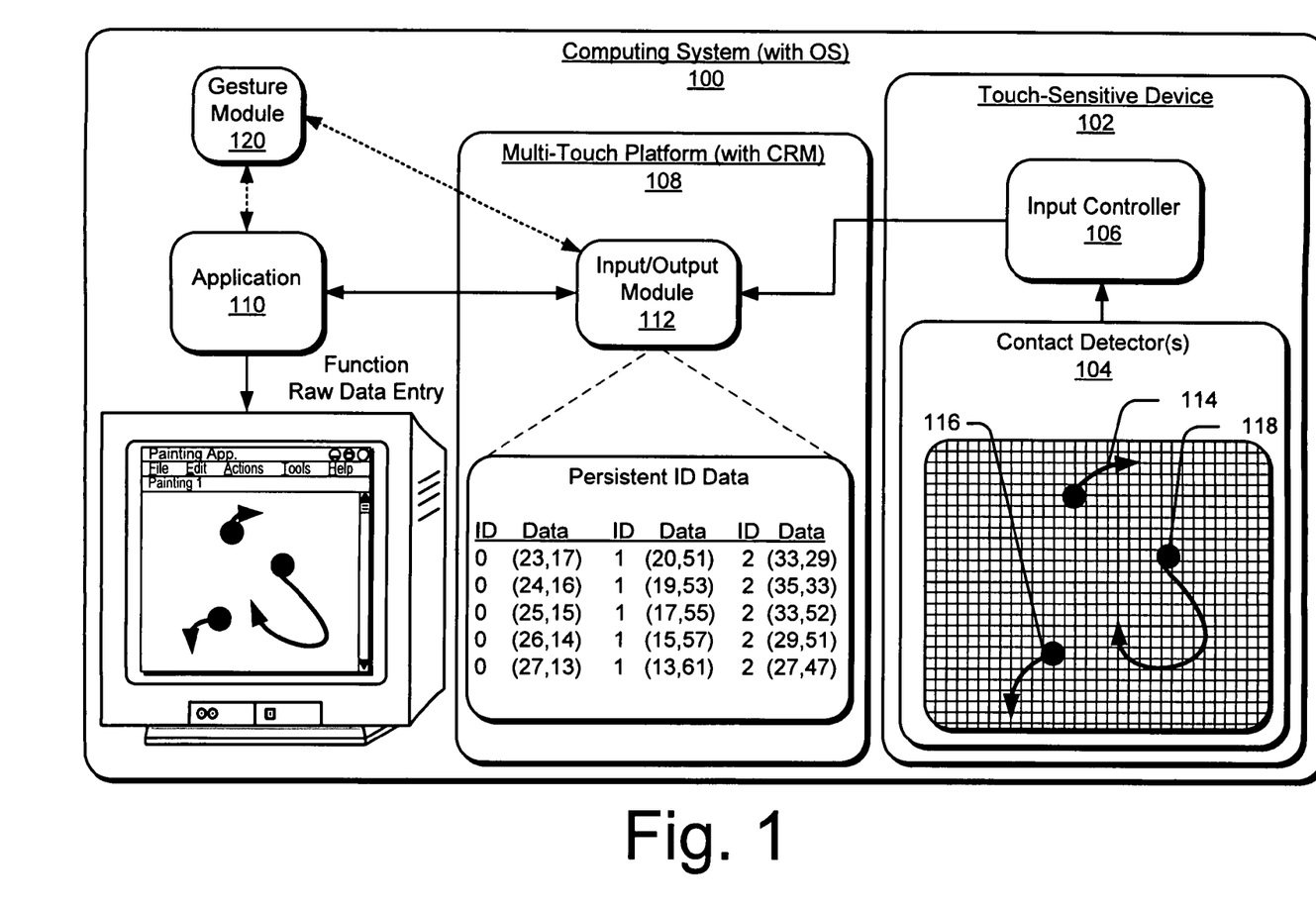
FIG. 1 is an illustration of an example environment in which the tools may operate and/or be included.

FIG. 1 is an illustration of a computing system 100 in an example implementation in which the tools persistently identify multiple tactile inputs detected by a touch-sensitive device 102 (the touch-sensitive device comprises or has access to computer-readable media (CRM) on which various applications, modules, applets, and the like may be stored). The computing system 100 includes an operating system (OS) for managing applications and programs that control hardware, such as processors, memory, displays, and the like, with which the computing system 100 interacts. Although a single application is shown, it may represent a single application or multiple applications operating within the OS.

Other electronic devices can benefit from the described tools. Example other electronic devices include media players, remote controls, smart phones, personal digital assistants, personal audio devices, global positioning systems, Internet appliances, wireless connectivity devices, vehicle control systems, vehicle entertainment systems, tablet computers, laptop computers, standalone input and/or output devices, and the like.

The touch-sensitive device 102 includes one or more contact detectors 104 capable of detecting concurrent tactile inputs. Although touch-sensitive device 102 is shown separate from a display, the touch-sensitive device may also be integrated with a display. In these embodiments, the contact detectors included in the touch-sensitive device 102 may be aligned with the pixels of the display. The contact detectors' output represents or otherwise reflects the tactile input detected.

In some embodiments, an input controller 106 is included in the touch-sensitive device 102 to convert the contact detector output into contact data that is useable by other components in the computing system 100. The input controller 106 may be a separate module or implemented within computing system 100.

The input controller 106 may combine output from multiple contact detectors 104, output from different types of detectors, and/or other data previously generated by the input controller 106 into contact data. This contact data represents the detected tactile inputs. Various kinds of information may be included about the tactile inputs, such as pressure, height and width of contact, speed, angle, and the like. The input controller 106 may also index or insert a time stamp in the contact data to indicate what timeframe is associated with the contact data or replace a contact detector's output with an x-y position (e.g., an x-y pair) based on the input controller's knowledge of the location of the contact detectors 104.

A multi-touch platform 108 with an input/output module 112 is included in the computing system 100 and interacts with an application 110. The application provides or performs a function initiated by the input/output module 112 based on the contact data obtained from the input controller 106. The multi-touch platform comprises or has access to computer-readable media (CRM) on which various applications, modules, applets, and the like may be stored. In some embodiments the touch-sensitive device 102 includes the multi-touch platform 108 or the multi-touch platform's functions are provided by general purpose resources included in the computing system 100. In further embodiments, the input/output module 112 and the input controller 106 are incorporated in a common module. The multi-touch platform 108 may also be an implementation of an application program interface (API) that is suitable for use with the application 110.

The input/output module 112 in some embodiments, or the touch-sensitive device in some other embodiments, is capable of persistently identifying contact data and/or a tactile input with a unique identification that persist as long as the tactile input is represented in the contact data. Thus, in some cases the touch-sensitive device 102 detects and tracks tactile inputs—it ensures that a contact with the device has a same input/output module for the duration of its existence (e.g., contact down, then contact moves, then contact removed). When the touch-sensitive device 102 provides the data (here the tactile input) to the input/output module 112, it provides it with a unique identifier. From this point, the input/output module may know which data is for which contact, and thus the tactile input for that contact is not confused with data from some other contact.

The input/output module, however, may map each tactile input to cursor IDs, which are then provided to the application 110. The input/output module may re-use its IDs, for example with IDs 1, 2, 3, 4, and 5 for a device capable of detecting five inputs (e.g., five fingers, five styluses, or some combination of these). This enables the input/output module 112 to address several scenarios. In a first scenario, the input/output module 112 exposes the application 110 and the computing system's platform including the computing system's operating system (OS) to contact data or contact inputs representing multiple tactile inputs, thereby permitting a user to interact and so cause the application 110 to enter raw data via the touch-sensitive device 102. In this way, the application 110 enters the raw data as initiated by the input/output module 112. The raw data may be obtained from the contact data or the contact input recognized by the input/output module 112. For example, a painting application 110 may accept x-y data included in the contact data when a user makes three tactile inputs (three are shown: a first tactile input 114, a second tactile input 116, and a third tactile input 118) via the touch-sensitive device 102.

In another scenario, the input/output module 112, the computing system 100 (with a gesture module 120 therein acting between the input controller 106 and the application 110), or the application 110 can recognize gestures that are mapped to functions. Some gestures are mapped to functions provided or known by the computing system (e.g., pan, zoom, rotate, and the like), in which case the computing system may recognize gestures based on contact data. In some other cases, gestures are provided by the application 110, in which case the application may recognize the gestures using contact data. A gesture may be a combination of tactile inputs as electronically represented in contact data. As noted, a function mapped to a gesture can be application-specific or OS-specific. When OS-specific, the computing system 100 may include the gesture module 120 with communications marked with dotted arrows.

When the application 110 is entering raw data, the input/output module 112 can handle the individual tactile inputs (e.g., a first, second, and third tactile inputs, respectively, 114, 116, and 118) represented in the contact data as cursors that enter the data in the application 110. Thus, if a user is attempting to paint a picture using three fingers, the input/output module 112 uniquely identifies the contact data representing the individual tactile inputs with an individual cursor identification (cursor ID) to detect and track the data. As noted above, the input/output module 112 may receive an identifier from the touch-sensitive device 102 and then provide a cursor ID that the input/output module 112 ensures is unique. For example, the input/output module 112 may identify x-y positions with a cursor ID (e.g., 0, 1, and 2) so that the application 110 is informed as to what x-y data is associated with the cursor. The cursor ID persists for so long as the device recognizes the contact (e.g., at least until a user removes his/her finger).

When the input/output module 112 is handling raw data, the behavior of the contact inputs may mimic input events, such as stylus or mouse events like pen down, pen up, pen move, or mouse up, mouse down, mouse move, mouse click and the like. As a result, the input/output module 112 initiates the application 110 to enter the raw data. In this embodiment, the input/output module 112 passes cursor IDs as an argument or a parameter to a notification so that the application 110 is made aware of which cursor (e.g., contact input or contact data) is entering the data. In this manner, the multi-touch platform 108 may implement an API configured for multiple tactile inputs. In some embodiments this API is semantically similar to a single mouse or single stylus API and includes a particular cursor ID in the notification passed by the input/output module 112 to the application 110.

In a single-tactile-input scenario, the input/output module 112 may include the cursor IDs in the notification communicated to the painting application 110 even though the remaining cursor IDs are not associated with active cursors (e.g., not providing data). For example, the input/output module's notification includes a cursor ID even though the input/output module 112 has identified only one tactile input. In other words, the input/output module 112 still provides a cursor ID in the notification associated with a single tactile input even though the touch-sensitive device 102 has failed to detect additional tactile inputs. In this manner, additional tactile inputs are added without having to uniquely identify the original cursor when the additional tactile inputs are added.

In an embodiment of a stylus-down notification including a cursor ID for a real-time stylus API is described directly below, the StylusInfo argument includes the cursor ID:

```
HRESULT StylusDown(
    [in] IRealTimeStylus *piRtsSrc,
    [in] const StylusInfo *pStylusInfo,
    [in, range(0, 32)] ULONG cPropCountPerPkt,
    [in, size_is(cPropCountPerPkt)] LONG *pPacket,
    [in, out] LONG **ppInOutPkt
);
typedef struct StylusInfo
{
    TABLET_CONTEXT_ID tcid;
    STYLUS_ID cid;
    BOOL bIsInvertedCursor;
} StylusInfo;
```

In the above embodiment, the input/output module 112 makes the painting application 110 aware of which cursor (e.g., tactile input) should provide a stylus-down function by including the cursor ID in the StylusInfo argument above as part of handling the raw data so that the application 110 enters the data correctly.

When recognizing gestures associated with certain types of tactile inputs, the input/output module 112 initiates a function that is mapped to the gesture. The input/output module 112 may recognize or identify gestures based on single or combinations of tactile inputs, including by recognizing individual tactile inputs represented in the contact data in accordance with the input/output module's input mode. The input mode directs what gestures can be recognized. In this manner, the input/output module 112 can detect and track a tactile input from beginning to end (e.g., from a finger starting at position $x_1, y_1$ on a touch-sensitive device moving along other positions, and ending at position $x_2, y_2$). The input/output module may do so for individual tactile inputs in a multi-touch scenario. Thus, the input/output module 112 can recognize individual inputs in a multi-touch scenario without interfering with single-touch scenarios in which a single tactile input mimics computer "mouse"-type behavior.

In some embodiments, the input/output module 112 determines or the application 110 may inform the input/output module 112 as to whether the input/output module 112 is to initiate data entry or recognize gestures that are mapped to functions. If, for instance, the application 110 is a painting application, the input/output module 112 may handle the contact data as data that is to be communicated to the painting application 110 with a cursor ID and paint flows from all contacts. When the input/output module 112 is interacting with an Internet browser application 110, the input/output module 112 recognizes gestures that are mapped to a function (e.g., pan, rotate, primary select, route find, copy, store, and the like) performable by an Internet browser application.

Further still, in some embodiments a raw-data mode may be used, which may be selected or otherwise opted into by an application, the input/output module 112, or a user. In the context of a painting application, for example, the painting application (e.g., application 110) may inform the platform 108 that a raw-data mode is desired. The platform may then disable gesture detection and create instances of a state machine or other entity capable of handling tactile input for each contact (e.g., one for each of five fingers). Input from each contact may then be handled separately and in a manner directed to the application's needs. In the painting context, for example, each finger may have single-finger events, such as tap, drag, hold-to-enter, right-drag, and right-tap. Each of these events may then map to functions used by the application and/or specific to the application.

As shown in FIG. 2 and returning again to the example of Emily surfing the Internet, consider multi-touch-enabled touch-sensitive device 202. Emily's phone 200 should address the above scenarios so that Emily is satisfied with the features of her smart phone. To do so, Emily's phone should be capable of detecting and tracking a sufficient number of tactile inputs (a first tactile input 204 and a second tactile input 206 are shown) so that Emily can intuitively surf the Internet.

Figure 2:
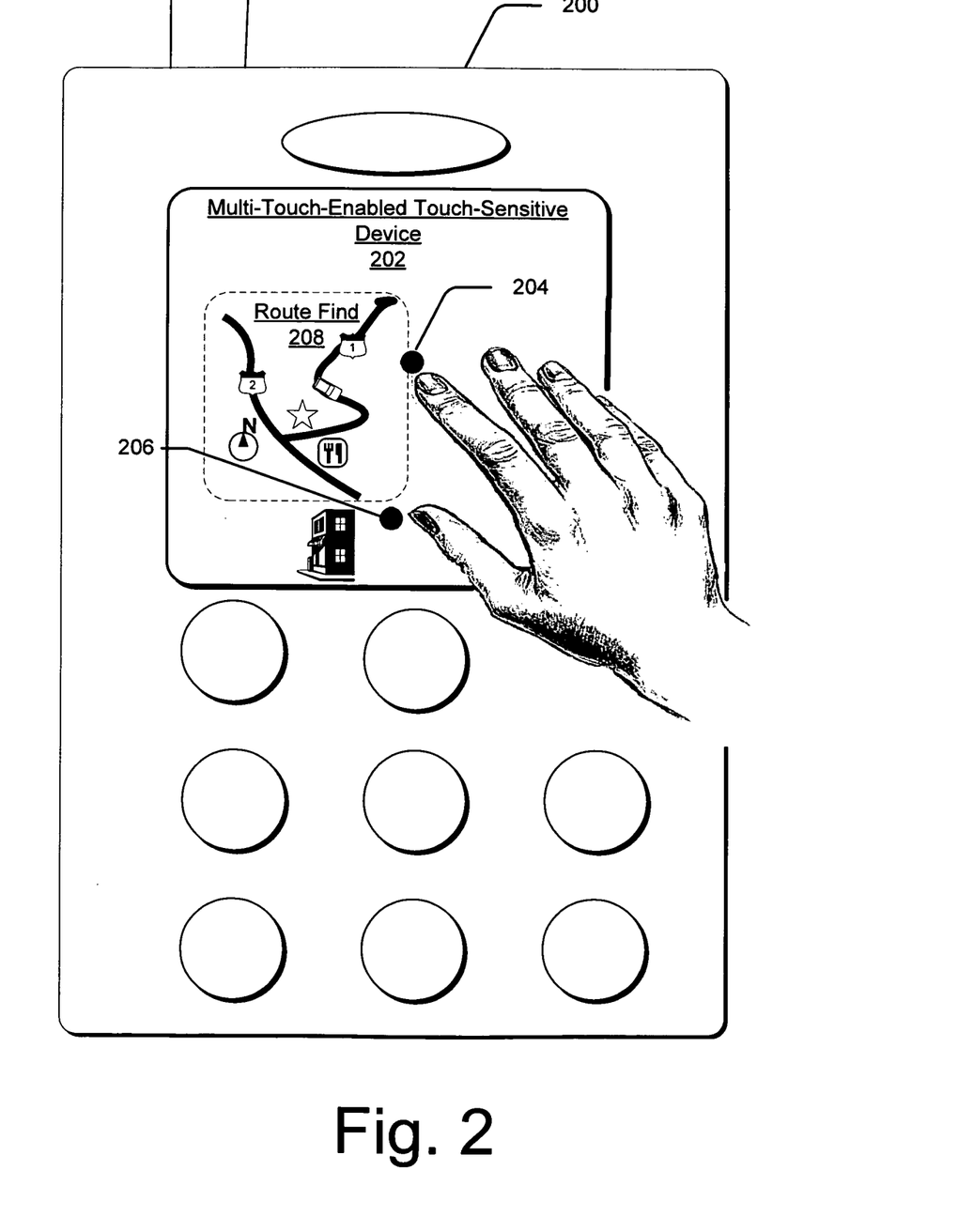
FIG. 2 is an illustration of a smart phone accepting multiple tactile inputs mapped to a function.

When surfing the Internet, Emily may perform gestures that result in tactile inputs rather than interacting with a graphic user interface (GUI), such as a toolbar. If Emily is typical of most users, she may become dissatisfied with her smart phone's features if she cannot intuitively interact with her touch-sensitive device 202. The tools described herein permit Emily access to a wide variety of functions including entering data, manipulating data, performing tasks, and the like.

For example, after surfing the Internet for a nearby clothing store, Emily may wish to Instant Message (IM) her friend, Kira, to see if she would like to join her on a shopping trip. The input/output module 112 is assumed to be included in Emily's phone (not shown) and it (in conjunction with one or more applications in her phone) is configured to recognize when Emily is attempting to initiate a function using multiple tactile inputs and when she is entering raw data. The input/output module 112 in conjunction with a painting application, for example, may recognize raw data as a paint stroke. The input/output module 112 in conjunction with a word processing application, also for example, may recognize raw data as a gesture. Many current phones and computing devices, however, cannot recognize when Emily is attempting to initiate a mapped function using two or more fingers from a scenario in which Emily is attempting to initiate a function using a single finger.

The tools described herein, however, use the input/output module 112 to enable Emily to intuitively use her phone. The input/output module 112, for example, can be configured to persistently identify contact data or portions thereof that electronically represent tactile inputs with a unique identification unique among other currently used identifications. In at least this way the tools differentiate between multiple tactile inputs, thereby enabling functions having a greater depth or additional functions by which users may interact with applications and computer systems.

For instance, when Emily is surfing the Internet using an Internet browser application, she may access a route find function 208 by touching her thumb and forefinger to the touch-sensitive device 202. In this case, the contact detectors that Emily individually touched with her thumb or forefinger generate output based on the detected physical contact (a first tactile input 204 and a second tactile input 206). The output is converted into contact data that represents the tactile inputs (e.g., the physical contact between Emily's thumb or forefinger and the contact detectors generating the output).

The input/output module may persistently identify the contact data representing the contact between Emily's thumb and the touch-sensitive device as "0" (a zero identification), while the input/output module may persistently identify contact data representing the physical contact between Emily's forefinger and the touch-sensitive device as "1" (a one identification). In this example, the input/output module persistently identifies two portions of contact data with particular tactile inputs based on the contact detectors providing the output.

The input/output module may initiate a route find (e.g., a map) application to provide a visual display of a picture of the clothing store and a route find 208 display providing directions from Emily's current location to the clothing store.

This persistent identification associated with the forefinger contact endures even though Emily removes her thumb (e.g., one contact input is removed), the input/output module switches input mode, or the computing system reboots. Thus, when Emily removes her thumb from the touch-sensitive device, the contact data representing the forefinger is still persistently identified as "1" even though she removed her thumb. The input/output module continues to persistently identify contact data representing the tactile input between Emily's forefinger and the touch-sensitive device as "1" (a one identification) as long as the input/output module links contact data or a contact input with the forefinger tactile input (e.g., the input/output module continues to receive contact data representing the tactile input). The identification of the tactile input associated with Emily's forefinger may persist until the forefinger tactile input is no longer represented in the contact data. This may permit, for example, Emily to place her thumb down on Kira's location on the map to generate a second route find. This route find function maps Kira to Emily (note that Emily is located at the forefinger on the map).

Figure 3:
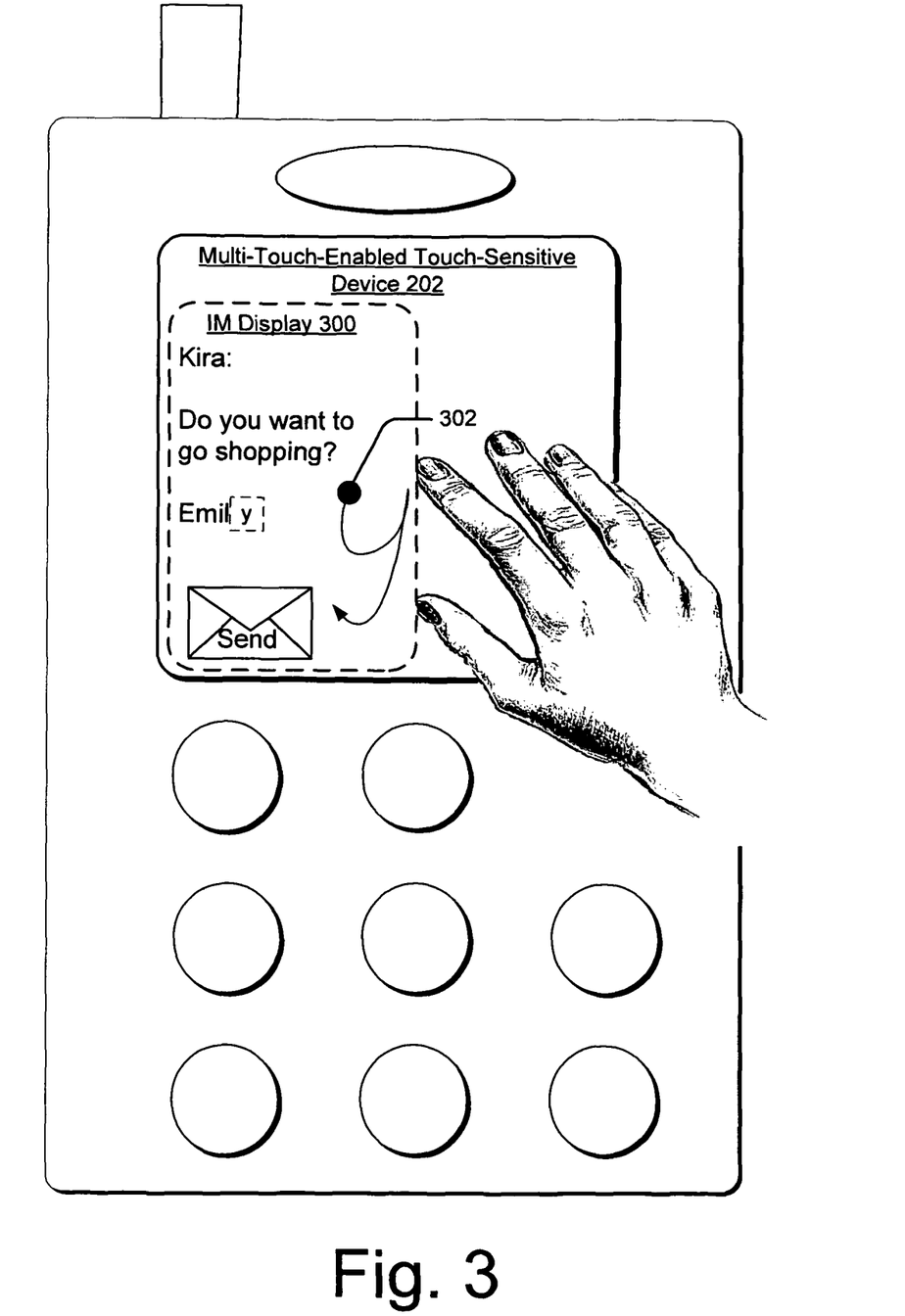
FIG. 3 is an illustration of a smart phone accepting a single tactile input mapped to a function.

As shown in FIG. 3, once Emily is done surfing the Internet, the input/output module initiates the IM application to display 300 a Unicode character "y" based on the input/output module recognizing a single tactile input shaped like the letter "y" that is mapped to a Unicode character "y" to be provided by the IM application (e.g., a mapped function). In this situation, the input/output module may persistently identify the contact data representing the y-shaped tactile input 302 with a zero identification. In this way, the input/output module can persistently identify the contact input representing the forefinger tactile input even though Emily subsequently touches her thumb to the touch-sensitive device 202 to initiate a send function that is mapped to two contact inputs.

Figure 4:
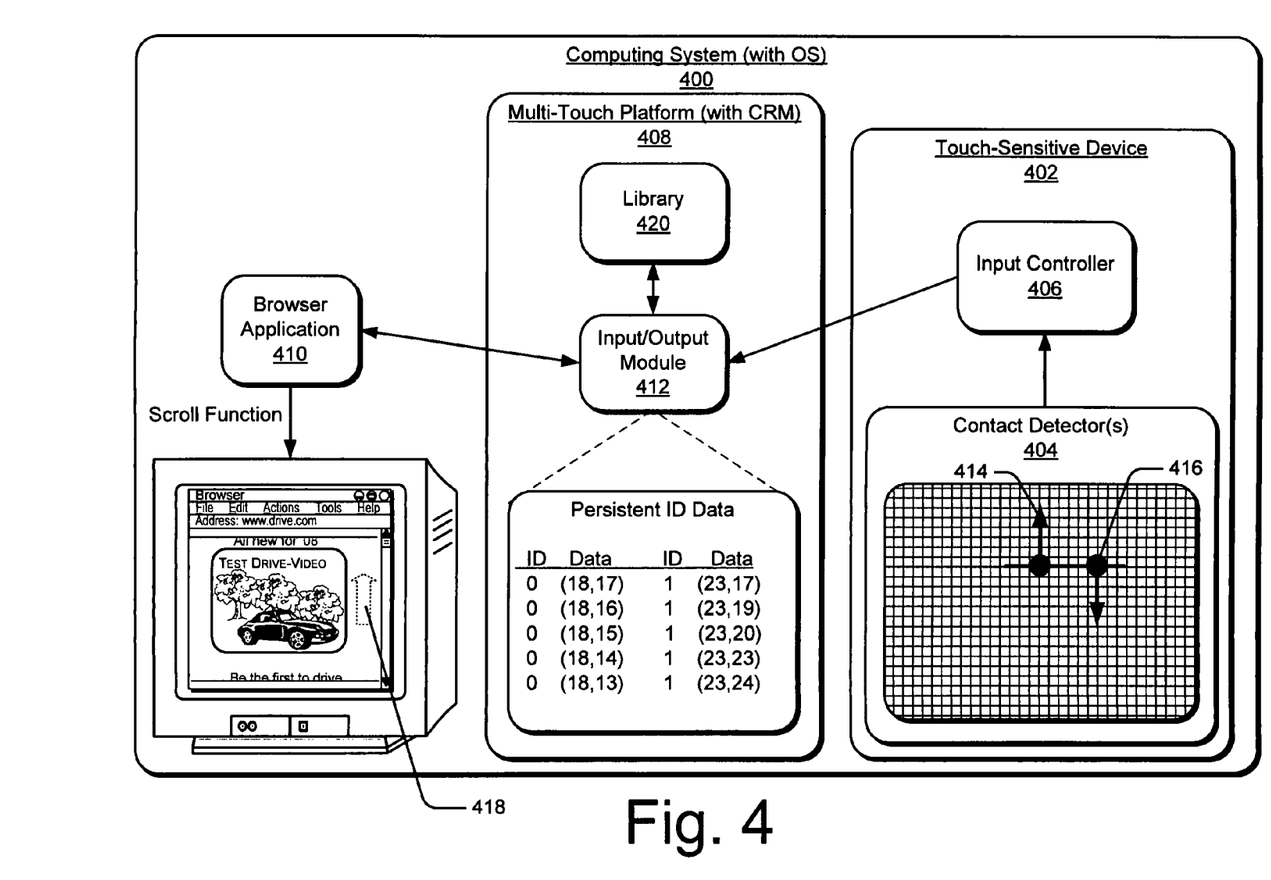
FIG. 4 is an illustration of an environment in which an example implementation of the tools may initiate a mapped function.

FIG. 4 illustrates an input/output module 412 initiating a function mapped to recognized gestures. The input/output module 412 can initiate a mapped function based on recognizing the tactile input as a gesture. The input/output module 412 may persistently identify the tactile input or the contact data representing the tactile input (a first tactile input 414 and a second tactile input 416 are shown) at least as long as the input/output module 412 receives contact data that represents the tactile inputs from input controller 406. The identification may persist even though the input/output module 412 changes input modes, the total number of contact inputs included in the contact data changes, computing system 400 reboots, and the like. When, for instance, a user removes one of his/her fingers previously making contact with a touch-sensitive device 402 the input/output module 412 continues to persistently identify the remaining tactile inputs with the previous identifications.

In this embodiment, the input/output module 412 uniquely identifies the contact inputs with persistent identifications that are unique among the current contact inputs rather than being entirely unique (e.g., among current one or more identifications). For example, the input/output module 412 may be configured to persistently identify a first contact input as "0", while subsequent contact inputs are numbered "1" through "4".

The input/output module 412 may initiate a mapped function in part because a multi-touch platform 408 is interacting with an Internet browser application 410 that is configured to provide mapped functions. Thus, the input/output module 412 may initiate the Internet browser application 410 to provide a scroll function 418 upon recognizing gestures that are mapped to the scroll function 418. For example, the input/output module 412 may access a lookup table include in a library 420 that associates the scroll function 418 with a first contact input and a second contact input that perpendicularly diverge from a common axis. In this case the input/output module 412 may persistently identify the first contact input as "0" and the second contact input as "1." The first and second contact inputs represent a first tactile input 414 and a second tactile input 416 that were detected by one or more contact detectors 404 included in the touch-sensitive device 402.

In some embodiments the input/output module 412 is messaging the application, such as when initiating a mapped function, in such a case the input/output module 412 reports on the available identifications even though no contact data is associated with the identification. A message is a notification that is passed to the application 410 to initiate the function that is mapped to the identified contact input. By way of example, when the touch-sensitive device 402 and input/output module 412 are configured to detect and identify, respectively, five contact inputs that represent five tactile inputs, the input/output module 412 message includes updates for the five input/output modules even though only two input/output modules are currently associated with active contact data.

In other embodiments, the application 410, with which the multi-touch platform 408 is interacting, updates the input/output module 412 with gesture context specific to the application 410. If the application 410 is a photo editing application, the application 410 may update or otherwise inform the input/output module 412 of specific gestures or functions that are relevant to the application 410. Thus, as the user interacts with a photo displayed on a display screen, the gesture context enables a transformation (e.g., an affine transformation) to permit the photo editing application 410 to display the photo's current size, rotation, position, and the like. A gesture context may be established as part of initiating communication between multi-touch platform 408 and application 410.

In some other embodiments, the application 410 may have functions that use cached data, such as that from a dragging finger (the cached data being from where the finger was previously placed). In some inking contexts (e.g., with a painting application), for example, the platform 108 puts into a queue data from a first tactile input 414 (received from the contact detectors 404). The platform 108 then waits on additional data from the touch-sensitive device 402. If the first tactile input starts to drag (move from its first location), a single-finger inking mode may be used. In this case, the cached data is replayed and future tactile inputs (e.g., 416) are ignored. If, before the first tactile input 414 starts to move a second tactile input 416 is received, the cached data is discarded and another mode is instead used, such as one for multi-touch gestures.

The components, modules, functions, and techniques discussed above may be implemented singly or in combination. Generally, any of the tools and functions described herein can be implemented using software, firmware, hardware (e.g., fixed logic circuitry), manual processing, or a combination of these implementations. Additionally, these functions and tools can be embodied as executable instructions that are included in one or more computer-readable storage media (e.g., multi-touch platform 108 and 408, input controller 106 and 406, and input/output module 112 and 412). The features of the techniques described below are platform-independent, meaning that the techniques may be implemented on a variety of platforms having a variety of processors and memory.

Example Techniques

The following discussion describes techniques that may be implemented utilizing the previously described systems and devices and may be implemented in hardware, firmware, software, or a combination thereof. The procedure is illustrated as a set of blocks that specify acts performed by one or more devices and are not necessarily limited to the order shown. A variety of other examples and sub-techniques are also contemplated.

Figure 5:
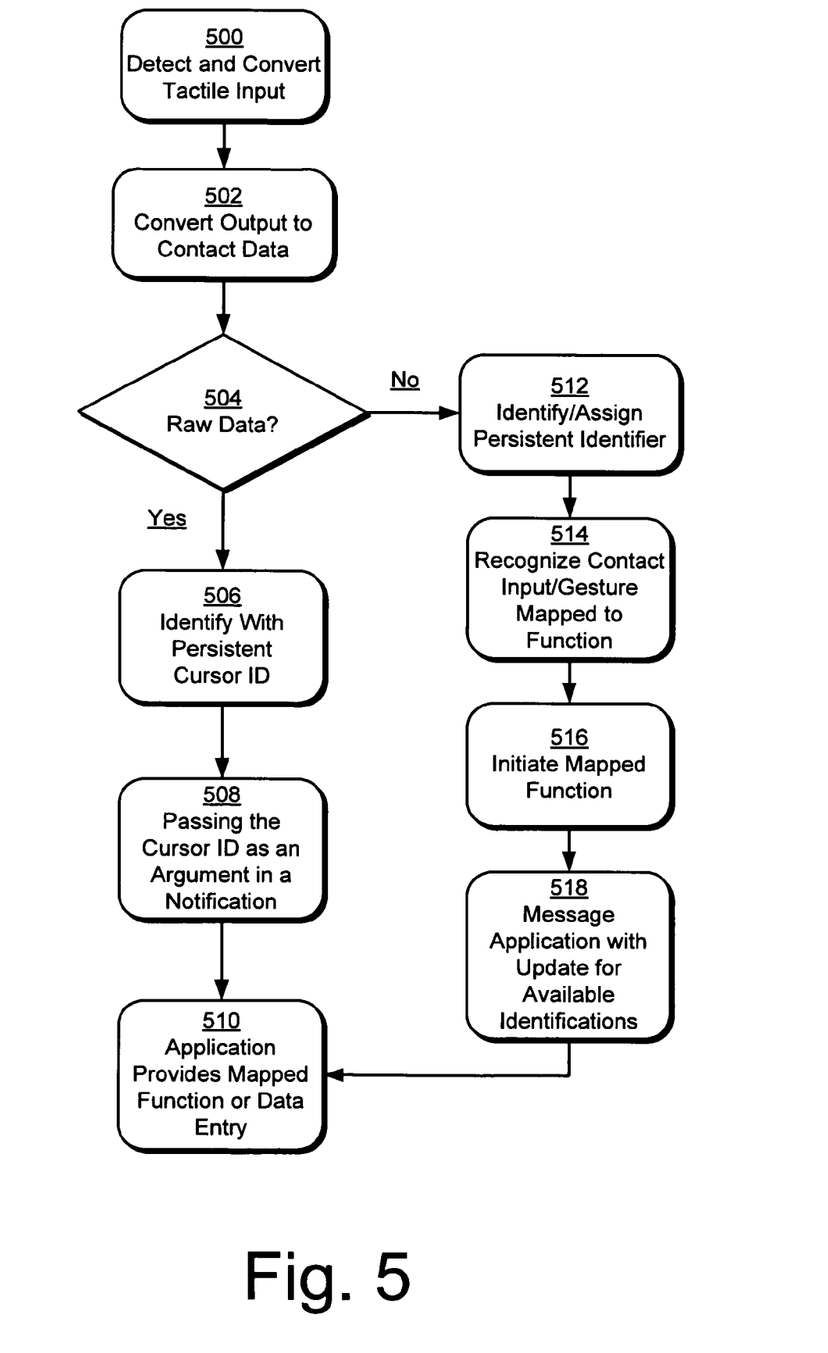
FIG. 5 is a flow diagram depicting a procedure in an example implementation by which the tools may act to differentiate contact data and initiate a function.

FIG. 5 depicts a procedure in an example implementation in which the tools differentiate between tactile inputs received through a multi-input touch-sensitive device and persistently identify a tactile input with a unique identification. Persistent identification may be used to help recognize gestures that are mapped to functions or to handle raw data for entry by an application (e.g., a data-entry function). With persistent identification, for example, the tools may assign colors to particular fingers for a painting application. Thus, a thumb could always be red, a forefinger blue, a ring finger yellow, and so forth.

Block 500 detects tactile inputs from an object (e.g., a user's finger or stylus) contacting a touch-sensitive device. The tools produce output from a user touching his/her finger to one or more contact detectors included in the touch-sensitive device. In some embodiments, the tools detect concurrent tactile inputs. The output represents the tactile input, such as the detected characteristics of the tactile input. For example, the output reflects the location of a tactile input, the force of a tactile input, the duration of the tactile input, and the like.

Block 502 converts the output to contact data. Contact data may include the location of the tactile input, the duration of the tactile input, movement, tactile input pressure, and the like. The tools may concurrently convert output from multiple tactile inputs. In some embodiments, the tools convert contact data for multiple tactile inputs by converting output as it arrives or by sampling contact detectors.

Block 504 determines whether the tools are handling data for entry in an application (e.g., initiating a raw-data-entry function) or are initiating a mapped function. The tools determine whether data is being entered or a mapped function is to be initiated based on the application that is interacting with the tools. For instance, if the tools are interacting with a word processing application, the tools may access a lookup table or other library for mapped functions. When the tools are interacting with an application that accepts or enters raw data, the tools initiate the application to enter and display x-y data obtained from the contact data. The tools' determination may be made as part of an initiation procedure with the application. The tools proceed to block 506 if raw data or block 512 if a gesture has a mapped function.

Block 506 persistently identifies the contact data and or the contact input with a cursor ID when the tools are interacting with an application that accepts raw data. The tools persistently identify contact data with a cursor ID so that the application enters the x-y data as if the data was provided by a cursor. The tools identify the raw data with a cursor ID that is unique among the current cursor IDs. In this manner, the tools individually detect and/or tract multiple tactile inputs as cursors that mimic the tactile inputs as represented by the contact data. The tools identify additional contact data in a similar manner.

Block 508 passes the cursor ID as an argument to the notification. The tools may pass the cursor ID as an argument to a notification communicated to the application. For example, a pen up notification includes the cursor ID as part of the argument so that the application is informed as to which contact input is providing the data.

Block 510 provides the raw data entry function using the cursor ID. The tools communicate x-y data identified with a cursor ID to the application that enters the raw data. For instance, a drawing application enters the x-y data and displays a cursor that mimics the tactile input as initiated by the tools.

If the tools determine that the tactile input is not intended for entry of raw data, the tools proceed to block 512, which persistently identifies contact data that represents a tactile input. When the tools are configured to initiate mapped functions, the contact data representing a tactile input is identified with an identification that is unique among the current tactile inputs represented in the contact data. In this manner, the tools detect and track the tactile input as represented by the contact data from other tactile inputs that are represented in the contact data.

Block 514 identifies one or more gestures. The tools may recognize the gestures by accessing a library or lookup table that maps tactile inputs associated functions. A persistent identification is used to identify individual inputs when the tools are recognizing multiple inputs. For example, when a user is making a pinching motion, the two diverging or converging tactile inputs are represented with a "0" (a zero identification) and with a "1" (a one identification), respectively. In this manner, the tools track the uniquely identified first and second inputs as they move. This may permit the tools to continue to identify the second input with a "1" even though the first tactile input is removed.

When the tools recognize the gesture associated with a mapped function, block 516 initiates the mapped function. For instance, if the tools identify two side-by-side taps (identified as tactile input "0" and tactile input "1") the tools initiate the application to double click on a graphical object. Mapped functions include, but are not limited to, storing data, zooming, panning, scrolling, entering Unicode text, and the like.

Block 518 messages the application with an update of the available identifications. The tools may send a message that includes an update for the available identifications even though some of the identifications are not linked to active contact data. After block 518 the tools proceed to block 510, which provides the mapped function that is initiated by the tools.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
receiving, at an input/output module and prior to receiving tactile input, an input mode selection from an application of which graphical objects are being displayed on a screen of a touch-sensitive device, the input mode selection indicating a type of touch input that is compatible with the graphical objects of the application and effective to cause the input/output module to enter a gesture recognition mode or a raw data entry mode;
receiving, at the input/output module and subsequent to receiving the input mode selection from the application, contact detector output from one or more contact detectors associated with the screen of the touch-sensitive device;

converting, via the input/output module, contact detector output into contact data that represents a first tactile input and a second tactile input detected by the one or more contact detectors;

identifying, via the input/output module and with a unique identification, first contact data of said contact data, said first contact data representing the first tactile input and said unique identification effective to differentiate said first contact data representing the first tactile input from second contact data representing the second tactile input; and initiating, via the input/output module and responsive to receiving the application's input mode selection of the gesture input mode, a mapped function of the application corresponding to a gesture recognized from the first contact data; or initiating, via the input/output module and responsive to receiving the application's input mode selection of the raw data entry mode, raw data entry of at least the first contact data for interaction with the graphical objects of the application.

2. The method of claim 1, further comprising, to initiate the mapped function, accessing a lookup table or other library containing the mapped function.

3. The method of claim 1, further comprising passing, to the application, the unique identification as an argument to a notification configured to initiate the mapped function of the application, wherein the unique identification is a cursor identification.

4. The method of claim 1,
wherein the act of converting converts contact detector output into contact data that further represents a third tactile input and a fourth tactile input detected by the touch-sensitive device;
wherein the act of identifying further identifies, with unique identifications, second, third, and fourth contact data of said contact data, said second contact data representing the second tactile input, said third contact data representing the third tactile input, and said fourth contact data representing the fourth tactile input, said unique identifications effective to differentiate each of said first, second, third, and fourth contact data; and
wherein the act of initiating further initiates:
another mapped function of the application corresponding to a gesture recognized from the second, third, or fourth contact data; or
additional raw data entry of the second, third, or fourth contact data for interaction with the graphical objects of the application.

5. The method of claim 1, further comprising, when in the raw data entry mode, assigning a single-finger event to either the first contact data representing the first tactile input or the second contact data representing the second tactile input.

6. The method of claim 1, wherein the unique identification persists until the first tactile input is not represented in the contact data and the input mode selection is received by the input/output module via an application programming interface (API).

7. The method of claim 1, wherein the graphical objects of the application include multi-color objects and the unique identification of the first contact data enables manipulation of a color of the multi-color objects that are different from another color of the multi-color objects through which manipulation is enabled by an identification of the second contact data.

8. The method of claim 1, wherein initiating raw data entry includes implementing a state machine to manage at least the first contact data representing the first tactile input and the second contact data representing the second tactile input.

9. A system comprising:
a screen configured to display graphical objects of an application, the application capable of accepting raw data input or gesture input to enable interaction with the graphical objects;
a touch-sensitive device associated with the screen and configured to detect two or more concurrent tactile inputs, the two or more concurrent tactile inputs being represented in contact data; and
an input/output module implemented by an application program interface (API) enabling interaction with the graphical objects of the application, the input/output module configured to operate in a gesture recognition mode or a raw data entry mode based on an input mode selection received from the application prior to the detection of the two or more concurrent tactile inputs;
the input/output module further configured to receive, from the touch sensitive device the contact data representing the two or more concurrent tactile inputs and to identify first contact data representing a first tactile input included in the two or more concurrent tactile inputs with a unique identification effective to enable differentiation between the first contact data and second contact data of the contact data; wherein based on the input mode selection received from the application, the input/output module is configured to:
initiate a mapped function of the application corresponding to a gesture recognized from the first contact data in the gesture mode; or
initiate the raw data entry of the first tactile input enabling interaction with the graphical objects of the application.

10. The system of claim 9, wherein the input/output module recognizes the gesture with which the mapped function corresponds from a group of current gestures from which the input/output module may select.

11. The system of claim 9, wherein the operations of the input/output module further comprise passing the unique identification as an argument to an input notification sent to the application.

12. The system of claim 9, wherein the operations of the input/output module further comprise:
identifying the second contact data representing the second tactile input included in the two or more concurrent tactile inputs with a second unique identification; and
recognizing another gesture based on the first contact data representing the first tactile input and the second contact data representing the second tactile input, the first contact data and the second contact data differentiated by the first unique identification and the second unique identification, respectively.

13. The system of claim 9, wherein the mapped function is associated with the first tactile input as represented in the first contact data.

14. The system of claim 13, wherein the graphical objects of the application are displayed on the screen associated with the touch-sensitive device via a graphical user interface (GUI) of the application.

15. The system of claim 13, wherein the unique identification is used to persistently identify the first contact data, unique among the contact data that represents the two or more concurrent tactile inputs, and capable of identifying subsequent tactile input once the first tactile input is no longer represented in the contact data.

16. One or more computer-readable memory devices having computer-executable instructions therein that, when executed, performs acts comprising:

displaying graphical objects of an application on a screen associated with a touch-sensitive device that includes one or more contact detectors;

receiving, from the application and prior receiving tactile input via the touch-sensitive device, an input mode selection specifying a type of touch input accepted by the application, the input mode selected being one of a raw data input mode or a gesture input mode for receiving the touch input;

receiving, from the touch-sensitive device and subsequent to receiving the input mode selection from the application, contact data that represents an individual tactile input included in two or more concurrent tactile inputs detected by the touch-sensitive device;

identifying the contact data representing the individual tactile input with a unique identification that is unique among two or more identifications individually identifying contact data representing one or more other concurrent tactile inputs of the two or more concurrent tactile inputs in the contact data, the unique identification effective to differentiate the contact data representing the individual tactile input from the one or more other concurrent tactile inputs; and initiating, responsive to receiving the application's input mode selection of the gesture input mode, a function of the application associated with a gesture recognized from the individual tactile input; or initiating, responsive to receiving the application's input mode selection of the raw data input mode, raw data entry of the individual tactile input for interaction with the graphical objects of the application.

17. The one or more memory devices of claim 16, wherein the instructions are further executable to message the application with an update of the two or more identifications.

18. The one or more memory devices of claim 16, wherein the application is a web browser, media player, navigational application, or text messaging client.

19. The one or more memory devices of claim 16, wherein the instructions are further executable to:

pass, via an application program interface (API), a notification to the application including the unique identification as an argument to the notification; and provide, using the unique identification, x-y information associated with the individual tactile input to implement the raw data entry with the application.

20. The one or more memory devices of claim 19, wherein the unique identification is a cursor identification and the notification is a pen or stylus notification.

\* \* \* \* \*